March 19, 1935.  D. G. WRIGHT  1,994,801
ANCHOR BRAKE SHOE BOLT
Filed Dec. 24, 1928
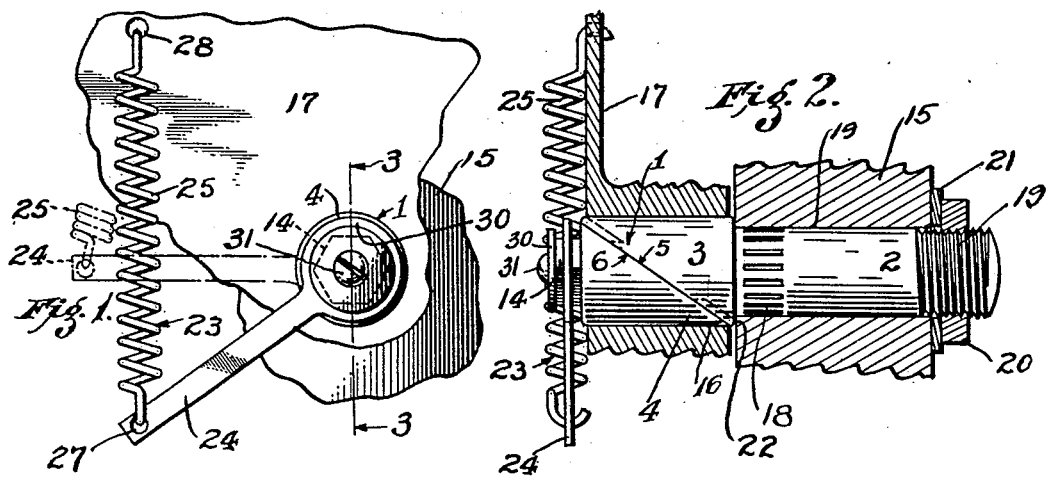
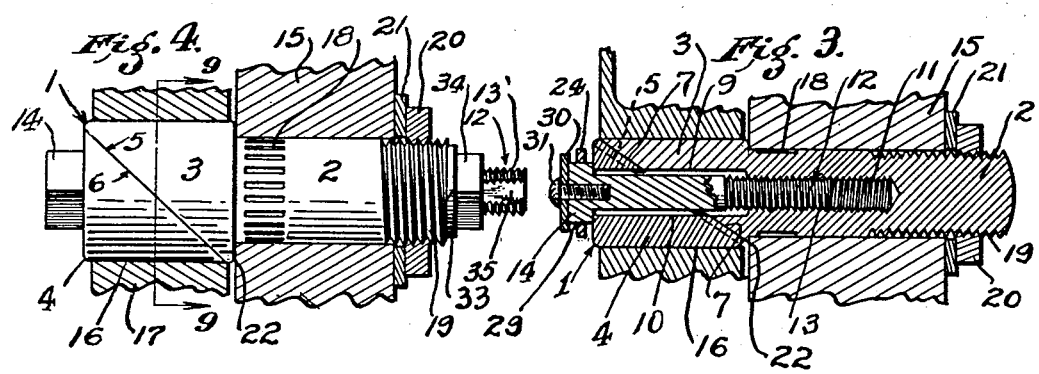
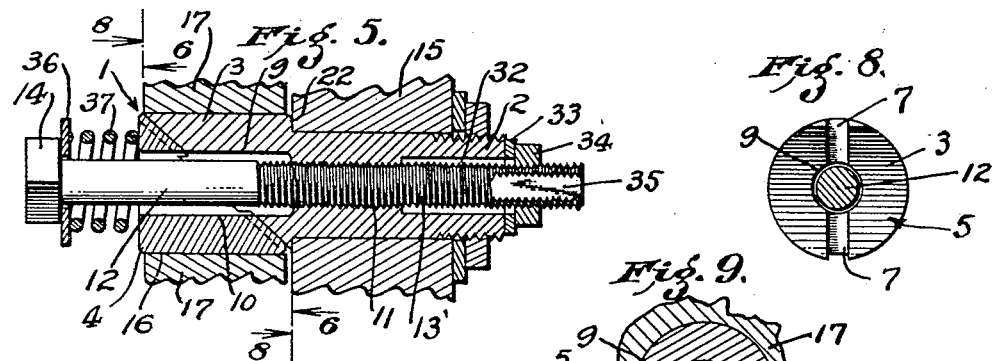
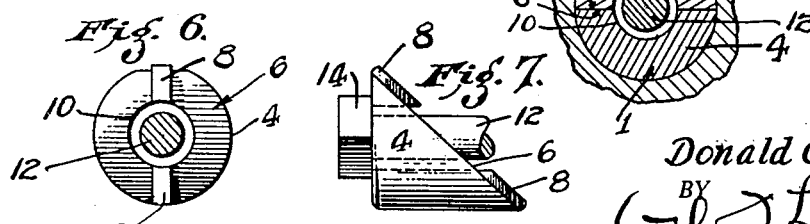
INVENTOR.
Donald G. Wright
BY
*his* ATTORNEY.

Patented Mar. 19, 1935

1,994,801

UNITED STATES PATENT OFFICE 1,994,801

ANCHOR BRAKE SHOE BOLT

Donald G. Wright, Los Angeles, Calif., assignor to Bendix Brake Company, South Bend, Ind., a corporation of Illinois Application December 24, 1928, Serial No. 328,301

14 Claims. (Cl. 188—79.5)

This invention relates to journals, and more particularly to journals for automobile anchor brake shoes.

The general object of the invention is to provide a novel journal for automobile brake shoes by means of which chattering and howling of the brake will be eliminated.

A more particular object is to provide an expansible journal for vehicle brake shoes which may be automatically or manually expanded to take up wear in the brake shoe bearing to maintain a snug fit and thereby prevent chattering and howling of the brake when applied to stop a vehicle.

Another object is to provide a novel expansion bolt in which likelihood of twisting and straining of the center bolt is reduced to a minimum.

Other objects, advantages and features of invention may appear from the accompanying drawing, the subjoined detail description, and the appended claims.

The invention is illustrated in the annexed drawing which forms a part of this specification and in which Figure 1 is an end view of my invention shown applied to a vehicle brake, a fragment of which is shown. Dot and dash lines indicate the automatic take-up means in advanced position.

Fig. 2 is a side elevation of my invention as illustrated in Fig. 1 with fragments of the brake support plate and the brake shoe shown in section.

Fig. 3 is a longitudinal section of my invention taken on line 3—3 of Fig. 1.

Fig. 4 is a side elevation of a modified form of my invention with the brake support plate and the brake shoe shown in section.

Fig. 5 is a longitudinal section of another modified form of my invention showing also a modified form of take-up mechanism.

Fig. 6 is a detail end elevation of the movable journal member taken on a plane indicated by line 6—6 of Fig. 5, and showing the center bolt in cross section.

Fig. 7 is a side view of the movable journal member, illustrating the key. A portion of the center bolt being shown.

Fig. 8 is a view analogous to Fig. 6 and taken on a plane indicated by line 8—8 of Fig. 4, but showing the stationary journal member with key way and with the center bolt in section.

Fig. 9 is a cross section of the journal taken on line 9—9 of Fig. 4.

My invention includes an expansible journal 1 and a journal shank 2. The journal comprises two members, a stationary member 3 formed on one end of the shank 2 and a movable member 4 slidably movable on said stationary member 3. The members 3 and 4 are formed with interengaging inclined flat surfaces 5 and 6 which extend diagonally across the journal 1 from one end thereof to the other. The surface 5 of the journal member 3 is provided with grooves 7 extending longitudinally of the surface 5 and which form a key way and in which are slidably fitted tongues or keys 8 formed on the inclined surface 6 of the journal member 4, whereby the journal members are maintained in sliding alignment.

The journal members 3 and 4 are provided with axial bores 9 and 10 respectively while the journal shank 2 is provided with a threaded axial bore 11 which leads from the inner end of the bore 9 of the journal member 3. A center bolt 12 extends through the journal bores 10 and 9 with its threaded end portion 13 engaging the threaded bore 11 of the journal shank 2 whereby the head 14 of the bolt is drawn against the outer end of the journal member 4 for drawing or forcing the journal member 4 toward the journal member 3. The shank 2 extends through and is secured to the brake support plate 15 of a vehicle brake construction whereby the journal is supported while the journal 1 extends through the bearing 16 of the internal brake shoe 17 whereby the brake shoe is journaled in operative position in a vehicle brake. The shank 2 is formed with corrugations 18 around its inner end for binding against the wall of the bore 19 in the brake support plate 15, through which bore said shank 2 extends, whereby said inner end of the shank is held tightly in the brake support plate. The outer end of the shank 2 is provided with a thread 19 which is engaged by a nut 20, there being a lock washer 21 fitted over the outer end of the shank against the outside of the brake support plate 15 against which washer the nut 20 engages, whereby the shank is drawn in said plate 15 until the shoulder 22 between the shank and journal member 3 engages the other side of the plate 15, thus detachably securing the shank firmly in said plate.

Automatic take-up means 23 is provided for expanding the journal 1 to take up looseness in the brake shoe bearing 16, which means as shown in Figs. 1, 2 and 3, comprises an arm 24, fitted as a wrench on the head 14 of center bolt 12, and a spring 25 connected at one end to the outer end of said arm as at 27 and at its other end to the brake shoe as at 28. The head 14 of the bolt 12 may be square, hexagonal, or other suitable shape and the inner end of the arm 24 provided with an opening 29 in which is fitted the head of the bolt so that the bolt will be turned with said arm. A disc 30 of larger diameter than the head 14 of the bolt 12 is secured on the outer end of the head by a screw 31 to prevent the wrench arm 24 from sliding off said head.

The spring 25 applies an upward pull on the arm 24 which will automatically turn the center bolt 12, and the threaded end 13 of said bolt engaging the shank thread 11, will cause the bolt to move inwardly and the head 14 of the bolt engaging the outer end of the journal member 4, whereupon the sliding engagement of the inclined faces 5 and 6 of the journal members 3 and 4 will expand the journal 1 in the brake shoe bearing 16, thus automatically taking up any looseness in said bearing and preventing chattering and howling of the brake.

In the forms of my invention shown in Figs. 4 and 5 a bore 32 is drilled in the outer end of the shank 2 to the threaded bore 11 while the threaded portion 13' of the bolt 12 which engages the threaded shank bore 11, is elongated and extends through said threaded bore, the bore 32 and the outer end of the shank 2. A lock washer 33 is fitted over the outer end of the bolt 12 against the outer end of the shank 2 and a nut 34 is fitted on the threaded end portion 13' of the bolt and engages the washer 33 and when turned is adapted for drawing the head 14 of the bolt toward the outer end of the journal 1. The end of the threaded portion 13' of the bolt 12 is formed on opposite sides with flattened surfaces 35 to provide a wrench seat for turning the bolt when adjustment of the same is desired.

In the form of my invention shown in Fig. 4 the head 14 of the bolt 12 engages the outer end of the journal member 4, while the arm 24 and spring 25 are eliminated. Upon applying a wrench to the bolt head 14 and turning the bolt 12 the threaded portion 13' of the bolt engaging the threaded bore 11 causes the head to force the journal 4 inwardly, while the engagement of inclined faces 5 and 6 of the journal members 3 and 4 expands the journal to take up looseness in the brake shoe bearing 16. When such looseness is taken up by the bolt the journal may be locked expanded in the bearing by tightening the lock nut 34.

In the form of my invention shown in Fig. 5 a washer 36 is fitted on the bolt 12 against the inner side of the bolt head 14, and a coil spring 37 surrounds the bolt 12 and operates between said washer and the outer end of the journal member 4. The spring 37 automatically forces the journal member 4 inwardly and the engaging inclined surfaces 5 and 6 expand the brake shoe bearing. The tension of the spring may be adjusted by turning the bolt 12 and said bolt may be locked in adjusted position by means of the lock nut 34.

From the foregoing it will be apparent from the constructions illustrated in Figs. 1-3 and 5 that as wear in the bearing 16 takes place that the spring means 25 or 37 will automatically exert a constant pressure against the slidable member 4 and take-up such slack or wear and maintain a snug fit between the bearing 16 and journal 1.

The keyway 7 and key 8 formed in the inclined surfaces 5 and 6 of journal member 4 effectively eliminate all likelihood of twisting and straining the center bolt 12 when the said bolt 12 is automatically adjusted by the automatic take-up means as shown in Figs. 1-3 and 5 or manually adjusted as shown in the construction illustrated in Fig. 4.

I claim:

1. An expansion bolt comprising a journal formed in two members, each member being formed with an inclined surface engaging the inclined surface of the other member; a supporting shank formed on one of said journal members, said shank being provided with a threaded bore, and a bolt extending through said journal members in threaded engagement with said threaded bore, the head of said bolt engaging the outer end of the other journal member for forcing said member inwardly and its inclined surface in engagement with the inclined surface of the first said journal member for expanding the journal when the bolt is turned.

2. An expansion bolt comprising a journal formed in two members, each member being formed with an inclined surface engaging the inclined surface of the other member; a supporting shank formed on one of said journal members, said shank being provided with a threaded bore, and a bolt extending through said journal members in threaded engagement with said threaded bore, the head of said bolt engaging the outer end of the other journal member for forcing said member inwardly and its inclined surface in engagement with the inclined surface of the first said journal member for expanding the journal when the bolt is turned; and automatic means for turning said bolt for expanding said journal.

3. An anchor brake shoe bolt comprising a journal formed in two members, each member being formed with an inclined surface engaging the inclined surface of the other member; a supporting shank formed on one of said journal members, said shank being provided with a threaded bore, and a bolt extending through said journal members in threaded engagement with said threaded bore, the head of said bolt engaging the outer end of the other journal member for forcing said member inwardly and its inclined surface in engagement with the inclined surface of the first said journal member for expanding the journal when the bolt is turned; an arm connected to the head of said bolt; and a spring connected to said arm for turning said bolt to expand said journal.

4. In combination with a vehicle brake, including a brake shoe and a brake support plate, a journal fitted in a bearing of the brake shoe, said journal being formed in two members, each member being formed with an inclined surface engaging the inclined surface of the other member, a supporting shank formed on one of said journal members, means for securing said shank in the brake supporting plate, said shank being provided with a threaded bore, a bolt extending through said journal members in threaded engagement with said threaded bore, the head of said bolt engaging the outer end of the other journal member, for forcing said member inwardly and its inclined surface in engagement with the inclined surface of said first journal member for expanding the journal when the bolt is turned.

5. In combination with an automobile brake including a brake shoe and a brake support plate, a journal being formed in two members, each member being formed with an inclined surface engaging the inclined surface of the other member, a supporting shank formed on one of said journal members, means for securing said shank in the brake supporting plate, said shank being provided with a threaded bore, a bolt extending through said journal members in threaded engagement with said threaded bore, the head of said bolt engaging the outer end of the other journal member, for forcing said member inwardly and its inclined surface in engagement with the inclined surface of said first journal member for expanding the journal when the bolt is turned; and means for automatically expanding said journal.

6. In combination with an automobile brake including a brake shoe and a brake support plate, a journal fitted in the bearing of said brake shoe, said journal being formed in two members, each member being formed with an inclined surface engaging the inclined surface of the other member, a supporting shank formed on one of said journal members, means for securing said shank in the brake supporting plate, said shank being provided with a threaded bore, a bolt extending through said journal members in threaded engagement with said threaded bore, the head of said bolt engaging the outer end of the other journal member, for forcing said member inwardly and its inclined surface in engagement with the inclined surface of said first journal member for expanding the journal when the bolt is turned; an arm fitted on the head of said bolt, and a spring connected to said arm and to said brake shoe for turning said bolt to expand said journal.

7. An anchor brake shoe bolt comprising a journal formed in two members, each member being formed with an inclined surface engaging the inclined surface of the other member, the inclined surface of one member being formed with a longitudinal groove, a tongue on the inclined surface of the other member in sliding engagement with said groove for maintaining the journal members in expanding alignment; a supporting shank formed on one of said journal members, said shank being provided with a threaded bore, and a bolt extending through said journal members in threaded engagement with said threaded bore, and means engaging the outer end of the other journal member and said bolt for forcing said member inwardly and its inclined surface in engagement with the inclined surface of the first said journal member for expanding the journal when the bolt is turned.

8. In combination with an automobile brake, an expansible journal fitted in the bearing of the brake shoe, a shank formed on said journal extending through the brake supporting plate, a shoulder between the journal and said shank for engaging one side of said brake supporting plate, the outer end of said shank being threaded and a nut on said threaded end of said shank for engaging the other side of said brake supporting plate.

9. In combination with an automobile brake, a journal fitted in the bearing of the brake shoe, said journal being formed in two members, each member being formed with an inclined surface engaging the inclined surface engaging the inclined surface of the other member, a supporting shank formed on one of said journal members, means for securing said shank in the brake supporting plate, said shank being provided with threaded bore, and with a bore extending from said threaded bore through the outer end of said shank, a bolt extending through said journal members and through said bores cooperating with the outer end of the other journal members for forcing said member inwardly and its inclined surface in engagement with the inclined surface of said first journal member for expanding the journal when the bolt is turned and a lock nut on the outer end of the bolt for engaging the outer end of said shank for locking said bolt against turning.

10. In combination with an automobile brake, an expansible journal fitted in the bearing of the brake shoe, a shank formed on said journal extending through the brake supporting plate, a shoulder between the journal and said shank for engaging one side of said brake supporting plate, the outer end of said shank being threaded, the surface of said shank being corrugated for engaging the surface of the opening in said plate through which the shank extends, and a nut on the outer threaded end of said shank for engaging the other side of said brake supporting plate.

11. An expansion bolt comprising a journal formed in two members, each provided with an inclined surface in engagement with each other; a shank integral with and extending from one of said members and normally prevented from rotating; and means to prevent rotation of said members relative to each other but to permit relative slidable movement of said members.

12. An expansion bolt comprising a journal formed in two members; each provided with an inclined surface in engagement with each other; a supporting shank integral with and extending from one of said members and normally prevented from rotating; and means to prevent rotation of said members relative to each other but to permit relative slidable movement of said members; and means to automatically exert a tension on one of said members to urge the same in expanding position relative to the other member.

13. An expansion bolt comprising a journal formed in two members, a supporting shank integral with and extending from one of said members and normally prevented from turning; said members being each provided with an inclined surface in engagement with each other; a center bolt extending through said members and being provided with a head; and means operating between said head and one of said members to normally exert a pressure on said members to force the same into expanding position.

14. An expansion bolt comprising a journal formed in two members, a supporting shank integral with and extending from one of said members and normally prevented from turning; said members being each provided with an inclined surface in engagement with each other; a center bolt extending through said members and being provided with a head; and means operating to normally exert a pressure on said members to force the same into expanding position.

DONALD G. WRIGHT.

CERTIFICATE OF CORRECTION.

Patent No. 1,994,801. March 19, 1935.

DONALD G. WRIGHT.

It is hereby certified that error appears in the printed specification of the above numbered patent requiring correction as follows: Page 3, first column, line 67, claim 9, strike out the words "engaging the inclined surface"; and second column, line 9, same claim, for the syllable "bers" read ber; and that the said Letters Patent should be read with these corrections therein that the same may conform to the record of the case in the Patent Office.

Signed and sealed this 19th day of November, A. D. 1935.

(Seal)

Leslie Frazer
Acting Commissioner of Patents.